United States Patent
Lu et al.

(10) Patent No.: US 6,348,182 B1
(45) Date of Patent: *Feb. 19, 2002

(54) PROCESS FOR PRODUCING LITHIUM MANGANESE OXIDE WITH SPINEL STRUCTURE

(75) Inventors: Qi Lu, Osaka; Gohei Yoshida, Nara; Kazuhiko Hirao, Osaka; Yukinori Honjo, Tokyo, all of (JP)

(73) Assignee: The Honjo Chemical Corporation, Osaka (JO)

( * ) Notice: Subject to any disclaimer, the term of this patent is extended or adjusted under 35 U.S.C. 154(b) by 0 days.

This patent is subject to a terminal disclaimer.

(21) Appl. No.: 08/883,272

(22) Filed: Jun. 26, 1997

(30) Foreign Application Priority Data

Jun. 27, 1996 (JP) .............................. 8-167482
Sep. 17, 1996 (JP) .............................. 8-282804

(51) Int. Cl.[7] .................... C01G 45/12; H01M 4/50; H01M 4/58
(52) U.S. Cl. .................. 423/599; 429/224; 429/231.95
(58) Field of Search ............................. 423/599, 593, 423/605, 629; 429/224, 227, 232, 233, 238, 231.95

(56) References Cited

U.S. PATENT DOCUMENTS

| | | | |
|---|---|---|---|
| 4,062,920 A | * 12/1977 | Lindquist | 264/153 |
| 4,950,642 A | * 8/1990 | Okamoto et al. | 505/1 |
| 4,956,062 A | * 9/1990 | Ooi et al. | 204/153.15 |
| 4,959,282 A | * 9/1990 | Dahn et al. | 429/224 |
| 4,980,251 A | * 12/1990 | Thackeray et al. | 429/224 |

(List continued on next page.)

FOREIGN PATENT DOCUMENTS

| | | |
|---|---|---|
| EP | 0 279 235 A1 | 8/1988 |
| EP | 0 712 173 A1 | 5/1996 |
| JP | 60225358 | 9/1985 |
| JP | 4-198028 | 7/1992 |
| JP | 04253161 | 8/1992 |
| JP | 6-203834 | 7/1994 |
| JP | 7-78611 | 3/1995 |
| JP | 8-37006 | 2/1996 |
| JP | 8-37027 | 2/1996 |

OTHER PUBLICATIONS

STREM: Chemicals for Research–Metals, Inorganics, and Organo–Metallics. Catalog No. 18 (1999–2000). p. 1163. 93–0335.*

Haitao Huang and Peter G. Bruce; "3 V and 4 V lithium manganes oxide cathodes for rechargeable lithium batteries"; *Journal of Power Sources*; 1995; pp. 52–57.

A. Robert Armstrong and Peter G. Bruce; "Synthesis of layered $LiMnO_2$ as an electrode for rechargeable lithium batteries"; *Letters to Nature*; Jun. 6, 1996; vol. 381, pp. 499–500.

Tsutomu Ohzuku, Junji Kato, Keijiro Sawai and Taketsugu Hirai; "Electrochemistry of Manganese Dioxide in Lithium Nonaqueous Cells"; *J. Electrochem. Soc.,*; Sep. 1991; vol. 138, No. 9, pp. 2556–2560.

Primary Examiner—Steven P. Griffin
Assistant Examiner—Cam N. Nguyen
(74) Attorney, Agent, or Firm—Merchant & Gould P.C.

(57) ABSTRACT

A process for producing a lithium manganese oxide with a spinel structure for use as a cathode material of an organic electrolyte lithium ion secondary battery, which comprises: mixing at least one lithium compound selected from the group consisting of lithium hydroxide and lithium carbonate with manganese dioxide in a solvent consisting essentially of water or an aliphatic lower alcohol having from 1 to 3 carbon atoms or a mixture thereof, optionally in the presence of at least one organic acid selected from the group consisting of formic acid and acetic acid; allowing the resultant mixture to form a gel-like mixture; and drying the gel-like mixture as required; and calcining the resulting product.

16 Claims, 14 Drawing Sheets

U.S. PATENT DOCUMENTS

| | | | |
|---|---|---|---|
| 5,010,220 A | * 4/1991 | Apte et al. | 219/10.55 M |
| 5,153,081 A | * 10/1992 | Thackeray et al. | 429/194 |
| 5,240,794 A | * 8/1993 | Thackeray et al. | 429/224 |
| 5,496,664 A | * 3/1996 | Sterr | 429/224 |
| 5,578,395 A | * 11/1996 | Yoshimura et al. | 429/197 |
| 5,582,935 A | * 12/1996 | Dasgupta et al. | 429/218 |
| 5,605,773 A | * 2/1997 | Ellgen | 429/194 |
| 5,630,993 A | * 5/1997 | Amatucci et al. | 423/594 |
| 5,631,104 A | * 5/1997 | Zhong et al. | 429/194 |
| 5,641,468 A | * 6/1997 | Ellgen | 423/599 |
| 5,677,087 A | * 10/1997 | Amine et al. | 429/224 |
| 5,820,790 A | * 10/1998 | Amine et al. | 252/519.1 |
| 5,866,279 A | * 2/1999 | Wada et al. | 429/224 |
| 5,869,208 A | * 2/1999 | Miyasaka | 429/224 |
| 5,981,106 A | * 11/1999 | Amine et al. | 429/224 |
| 5,985,237 A | * 11/1999 | Lu et al. | 423/599 |

* cited by examiner

PROCESS FOR PRODUCING LITHIUM MANGANESE OXIDE WITH SPINEL STRUCTURE

BACKGROUND OF THE INVENTION

1. Field of the Invention

This invention relates to a process for producing a lithium manganese oxide which is suitable for use as a positive electrode or a cathode material of a non-aqueous electrolyte (organic electrolyte) lithium ion secondary or rechargeable battery. More particularly, this invention relates to a process for producing a lithium manganese oxide with a spinel structure which is suitable for use as a cathode material of a lithium ion secondary battery having a 4-V high energy density and excellent cycle performance by a simple process using less costly starting materials.

2. Prior Art

A lithium cobalt oxide, $LiCoO_2$ so far has been used as a high performance cathode material of a non-aqueous electrolyte lithium ion secondary battery. However, since the amount of cobalt from natural sources is small and it is expensive, a lithium manganese oxide with a spinel structure, namely, spinel $LiMn_2O_4$, has attracted attention as a cathode material of a non-aqueous electrolyte lithium ion secondary battery in the next generation.

In the non-aqueous electrolyte lithium ion secondary battery in which the spinel $LiMn_2O_4$ is used as a cathode material, lithium ions can be doped in the crystal lattice or removed therefrom in the charge or discharge process, with the result that the charge or the discharge stably can be conducted without greatly destroying the structure of the crystal lattice. Thus, the study for practical use of the spinel $LiMn_2O_4$ in the non-aqueous electrolyte lithium ion secondary battery has been conducted.

In a known dry method for producing spinel $LiMn_2O_4$, as described in Japanese Patent Application Laid-Open (Kokai) No. 4-198028, a powder of manganese dioxide and a powder of a lithium compound are mechanically dry-mixed directly, and the resulting powder mixture is calcined at a high temperature.

However, it is difficult to obtain a uniform powder mixture having a particle diameter of a submicron level by mechanically mixing manganese dioxide with a lithium compound, while the thermal conductivity of these metal oxides is quite low. Accordingly, in order to obtain spinel $LiMn_2O_4$ by calcining such a powder mixture, it is required that as described in Japanese Patent Application Laid-Open (Kokai) No. 7-78611 the powder mixture is calcined at high temperatures over a long period of from 10 to 100 hours and the calcination at such high temperatures is repeated. Besides, the initial charge-discharge capacity of the thus obtained cathode material falls far short of the theoretical value (148 mAh/g). When the charge-discharge process of the non-aqueous electrolyte lithium ion secondary battery which uses such a spinel $LiMn_2O_4$ as a cathode material therein is repeated, the charge-discharge capacity of the battery is notably deteriorated.

Meanwhile, a process which comprises dissolving manganese acetate and lithium acetate in ethylene glycol by heating, then removing the solvent to form a gel-like mixture, and calcining the mixture to provide spinel $LiMn_2O_4$ is described in Japanese Patent Application Laid-Open (Kokai) No. 6-203834. In this process, however, the starting materials used are costly, and it can hardly be employed as an industrial process for producing spinel $LiMn_2O_4$.

In general, a solid state reaction using two solid powders as reactants is carried out by heating the solid powders at high temperatures capable of moving ions or atoms constituting the reactants, and mutually diffusing the ions or the atoms between the solid phases of these two solid powders. Since the two solid powders cannot be mixed uniformly at the molecular level in this solid state reaction, the solid state reaction starts where the solid phases are brought into contact, and the reaction product is formed in the boundary therebetween. In order that the reaction product is formed in the boundary between the two solid phases and the reaction further proceeds, it is necessary to conduct the movement of the materials in which the ions or the atoms in at least one of the two solid phases pass through the layer of the reaction product and are diffused into the other solid phase. Accordingly, the smaller the particle diameter, the shorter the diffusion distance and the larger the diffusion surface. Thus, a dense product having a uniform composition easily can be obtained.

When spinel $LiMn_2O_4$ is produced by the dry method, it is necessary to mix manganese dioxide and a lithium compound as starting materials. In this case, manganese dioxide has a particle diameter of from several microns to tens of microns. Meanwhile, lithium hydroxide has a particle diameter which is approximately 100 times larger For this reason, it is impossible to mix these two compounds uniformly. Further, as noted above, metal oxides such as manganese dioxide and lithium manganate have a low thermal conductivity; when these compounds are heated to hundreds of degrees Celsius, it takes a few hours to make uniform the temperatures of the sample from the surface to the inner portion.

Thus, when the calcination temperature and time are inappropriate in the calcination of the mixture of the solid powders as starting materials at a high temperature to produce spinel $LiMn_2O_4$ by the conventional dry method, there arise temperature differences in the mixture, and the elements are locally concentrated. Consequently, products other than final spinel $LiMn_2O_4$ are formed. In particular, when the calcination temperature is too high, not only does the crystallization of the resulting lithium manganese oxide proceed excessively, but also undesirable by-products are formed, with the result that the performane of the resultant cell is adversely affected.

That is, in the formation of spinel $LiMn_2O_4$, it is important that the starting solid powders are uniformly mixed and that the mixture of the solid powders is uniformly heated at a high temperature to proceed rapidly with the desired solid state reaction.

Under these circumstances, the present inventors have assiduously conducted the formation of spinel $LiMn_2O_4$, and have consequently found that a gel-like uniform mixture of manganese dioxide and lithium compound can easily be obtained by mixing manganese dioxide with a lithium compound selected from lithium hydroxide and lithium carbonate, preferably lithium hydroxide, in a solvent which is selected from water, an alcohol and a mixture thereof, preferably either an alcohol or a mixture of the alcohol and water, to dissolve the lithium compound in the solvent, and diffusing the resulting lithium ions into pores of porous particles of manganese dioxide. This mixture is calcined preferably through combination of heating with microwave and with an electric furnace, making it possible to obtain desired spinel $LiMn_2O_4$ easily and efficiently. This finding has led to the completion of this invention.

SUMMARY OF THE INVENTION

As set forth above, this invention has been made to solve the problems in the conventional production of spinel $LiMn_2O_4$. It is an object of the invention to provide a process for producing a lithium manganese oxide with a spinel structure which is suitable for use as a cathode material having a high energy density and excellent cycle performance at high efficiency by a simple process using less costly starting materials. In particular, it is an object of the invention to provide a process in which a uniform gel-like mixture of manganese dioxide and a lithium compound easily can be obtained and spinel $LiMn_2O_4$ having excellent performace easily can be obtained by calcination of the gel-like mixture for a short period of time.

A first process for producing a lithium manganese oxide with a spinel structure according to the invention comprises mixing at least one lithium compound selected from the group consisting of lithium hydroxide and lithium carbonate with manganese dioxide in a solvent consisting essentially of water or an aliphatic lower alcohol having from 1 to 3 carbon atoms or a mixture of these, allowing the resutant mixture to form a gel-like mixture, drying the gel-like mixture as required, and calcining the resulting product.

A second process according to the invention comprises mixing at least one lithium compound selected from the group consisting of lithium hydroxide and lithium carbonate with manganese dioxide in a solvent consisting essentially of water or an aliphatic lower alcohol having from 1 to 3 carbon atoms or a mixture of these, in the presence of an organic acid selected from the group consisting of formic acid and acetic acid, allowing the resutant mixture to form a gel-like mixture, drying the gel-like mixture as required, and calcining the resulting product.

Futher according to the invention, in both of the first and second processes, it is advantageous that at least a part of heating for drying and calcining of the gel-like mixture is conducted through a combination of heating with microwave and heating with an electric furnace so that spinel $LiMn_2O_4$ suitable for use as a cathode material of a lithium ion secondary battery having excellent cycle performance can be produced readily at high efficiency.

DESCRIPTION OF PREFERRED EMBODIMENTS

Figure 1:
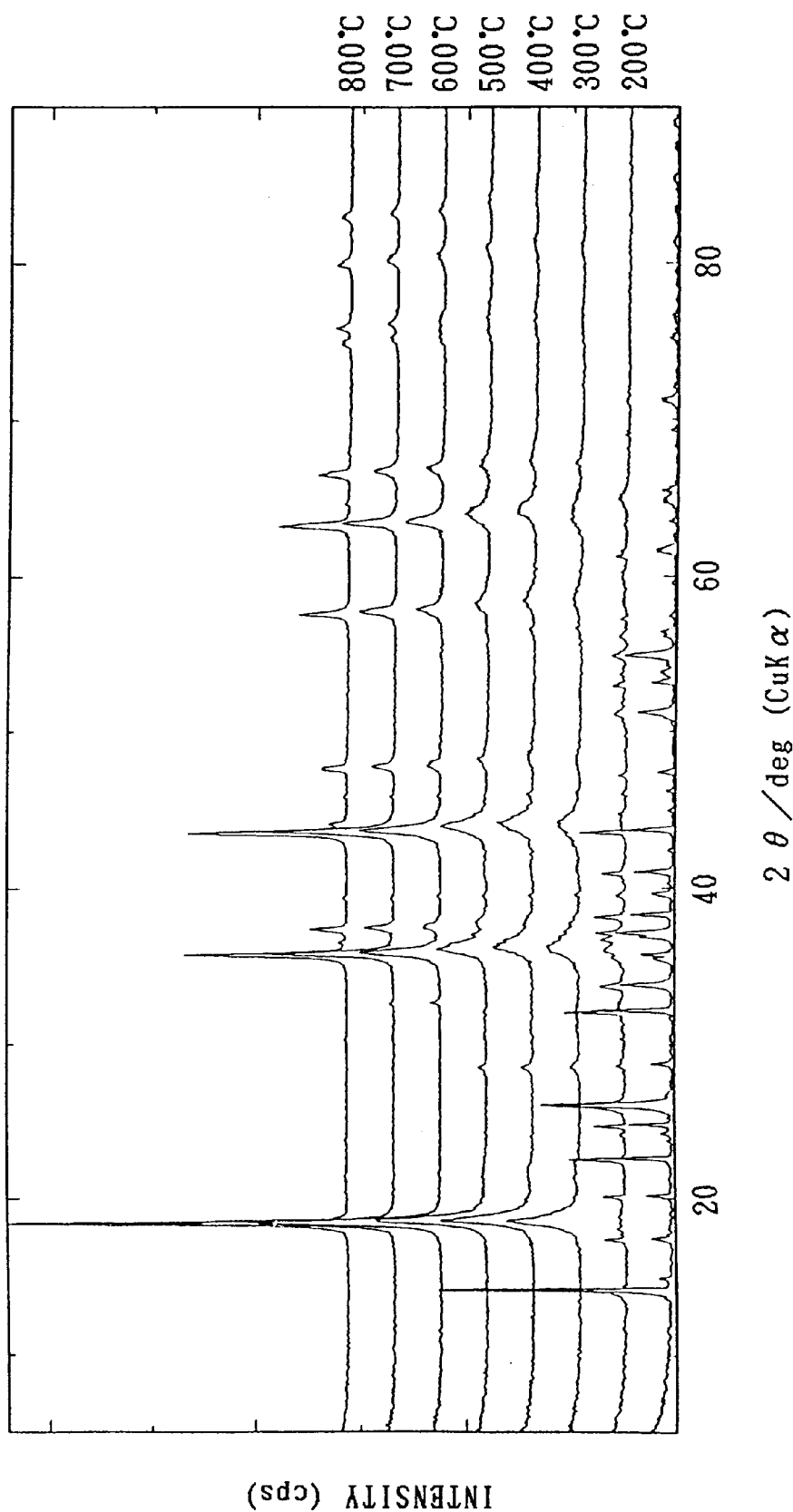
FIG. 1 is an X-ray diffraction pattern at different calcination temperatures when a gel-like mixture formed by the process of the invention is dried and then calcined.

In the invention, manganese dioxide and at least one lithium compound selected from lithium hydroxide and lithium carbonate are used in the form of powder. However, these starting materials are not particularly limited with respect to the particle diameter.

According to the first process of the invention, spinel $LiMn_2O_4$ is produced by mixing at least one lithium compound selected from the group consisting of lithium hydroxide and lithium carbonate with manganese dioxide in a solvent consisting essentially of water or an aliphatic lower alcohol having from 1 to 3 carbon atoms or a mixture thereof, allowing the resultant mixture to form a uniform gel-like mixture, drying the mixture when required, and calcining the resulting product.

In accordance with a preferred embodiment of the first process, manganese dioxide is first added to the solvent to form a suspension, and lithium hydroxide is then added to the suspension to dissolve the lithium compound in the solvent, and the resultant mixture is then stirred and allowed to form a gel-like mixture. Herein the specification, a method for preparing a gel-like mixture by mixing a lithium compound with manganese dioxide in the solvent and allowing the resultant mixture to form the gel-like mixture is sometimes called a liquate impregnation method.

Examples of the aliphatic lower alcohol having from 1 to 3 carbon atoms used as a solvent include methanol, ethanol, n-propanol and isopropanol. Of these, methanol is preferred. An aliphatic alcohol that may contain up to 20% by weight of water is also preferred.

In the process of the invention, the amount of the lithium compound is usually 1 mol part per 2 mol parts of manganese dioxide. The invention can provide spinel $LiMn_2O_4$ having a composition formula of $Li_xMn_2O_4$ in which x is between 0.9 and 1.2, preferably between 0.95 and 1.15, by appropriately adjusting the amount of the lithium compound relative to manganese dioxide. Accordingly, the invention easily can provide a lithium manganese oxide having a stoichiometric or non-stoichiometric spinel structure.

The amount of the solvent used is not particularly limited. It is usually between 20 and 200 milliliters per 100 g of manganese dioxide. When the lithium compound is mixed with manganese dioxide in the solvent, the gel-like mixture is formed usually within one hour.

More specifically, when the solvent contains the alcohol in the process of the invention and manganese dioxide and the lithium compound, preferably lithium hydroxide, are added to and mixed together in this solvent, a chemical reaction takes place between the lithium compound and the alcohol with heat generated. The lithium compound is dissolved as ions in the solvent, and the lithium ions are diffused into particles of porous manganese dioxide to form a uniform gel-like mixture. This gel-like mixture is, as required, dried by heating, and then calcined at high temperatures, thereby providing desired spinel $LiMn_2O_4$.

The second process according to the invention is the same as the above-mentioned first process except that the lithium compound is mixed with manganese dioxide in the above-mentioned solvent in the presence of at least one organic acid selected from the group consisting of formic acid and acetic acid, and the mixture is then allowed to react to form a gel-like mixture. According to the second process, a lithium manganese oxide of a spinel structure having a larger particle diameter can be formed by, as required, heating the gel-like mixture, drying the product and calcining the dried product. In this process as well, it is advisable to use the above-mentioned alcohol or a mixture of water and the alcohol, i.e., an alcohol-containing solvent, as the solvent.

According to a preferable embodiment of the second process, manganese dioxide and the lithium compound are added to the alcohol-containing solvent, and the above-mentioned organic acid is further added thereto, whereby not only the lithium compound but also manganese dioxide is dissolved in the solvent through a chemical reaction of manganese dioxide with the organic acid accompanied by heat generation to form a gel-like mixture. Therefore, according to the second process, the lithium compound and the manganese compound are uniformly mixed at a molecular level, whereby a more uniform gel-like mixture can be obtained.

The organic acid is, as set forth above, useful to dissolve manganese dioxide in the solvent, and in addition the organic acid is also useful to dissolve lithium carbonate in the solvent through a chemical reaction of the carbonate with the organic acid.

In the second process, the amount of formic acid or acetic acid used is not particularly limited, and it may be one-tenth the equivalent or more, preferably between one and 10 equivalents, relative to the lithium compound. Between the organic acids, formic acid is preferred since a part or or whole of manganese dioxide used is rapidly reacted therewith and dissolved in the solvent, depending on the amount of the acid used.

As stated above, in the first process of the invention, the lithium compound reacts with the alcohol-containing solvent, and is dissolved in the solvent so that it is diffused rapidly into porous particles of manganese dioxide to form a uniform gel-like mixture. In turn, in the second process of the invention, the lithium compound reacts with the solvent and is dissolved as ions in the solvent, while the manganese dioxide reacts with the organic acid and is dissolved in the solvent. Thus, lithium and manganese are mixed at a molecular level to form a uniform gel-like mixture.

In particular, when the gel-like mixture is prepared by the second process and is then calcined, preferably through combination of heating with microwave and heating with an electric furnace, there is obtained lithium manganese oxide comprised of larger crystals.

As described hereinbefore, in the process in which manganese dioxide is mechanically dry-mixed with a lithium compound, a uniform powder mixture having a particle diameter of a submicron level hardly can be obtained. However, in accordance with the invention, a uniform gel-like mixture can readily be obtained.

According to the invention, the gel-like mixture, which may be prepared either by the first or the second process, is dried and calcined thereby readily providing spinel $LiMn_2O_4$ that is particularly suitable for use as a cathode material of a lithium ion secondary battery.

The gel-like mixture may be dried simply by heating, or it may be spray-dried. Especially when the gel-like mixture is spray-dried, a uniform mixture of manganese dioxide and the lithium compound can be obtained advantageously in the form of fine particles having a fixed particle diameter. Further, the thus-obtained particulate mixture is calcined, whereby spinel $LiMn_2O_4$ that can be suitably used as a cathode material of a lithium ion secondary battery having a high energy density and excellent cycle performance can be obtained without conducting the subsequent pulverization.

According to the invention, the gel-like mixture is dried, and then calcined in an atmosphere of air at a temperature of from 500 to 800° C. for from 1 to 15 hours to form a nucleus of spinel $LiMn_2O_4$ in the reaction between the lithium compound and manganese dioxide at a stage of a relatively low temperature, usually 300° C. or lower. Then, as the calcination temperature is increased, the reaction proceeds to grow fine crystals of spinel $LiMn_2O_4$, thereby readily providing spinel $LiMn_2O_4$ having a large specific surface area.

When the calcination is conducted at a relatively high temperature of from 650 to 800° C., spinel $LiMn_2O_4$ can be obtained through calcination for a relatively short period of time, for example, for from 5 to 10 hours. Meanwhile, even when the calcination is conducted at a relatively low temperature of from 500 to 650° C., spinel $LiMn_2O_4$ can be obtained for a short period of from 10 to 15 hours. Crystals of spinel $LiMn_2O_4$ are excessively grown through the calcination at a high temperature over an excessively long period of time. If this spinel $LiMn_2O_4$ is used as a cathode material of a lithium ion secondary battery, no improvement in charge-discharge perormance is attained.

In both of the first and second processes of the invention, spinel $LiMn_2O_4$ can be obtained by drying the thus-obtained gel-like mixture if necessary, and then calcining the same through microwave heating. When the gel-like mixture is dried, the substance may be heated at a temperature of up to 100° C. to decrease the water content usually to less than 10% by weight, preferably to less than several percent. For example, it is preferred that the gel-like mixture is dried so that it has a water content of less than 5% by weight. The gel-like mixture may be spray-dried as noted above. The microwave heating also can be employed when drying the gel-like mixture as mentioned below.

The microwave is, as is well-known, one of electromagnetic waves having a wavelength of from 1 mm (frequency 300 GHz) to 1 m (frequency 300 MHz), and it has been hitherto used in communication, high-frequency heating, radar, medical care and the like. In the invention, a microwave having a wavelength of from 3 to 30 cm (frequency from 1,000 to 10,000 MHz) is especially preferred. However, the microwave which can be used in the microwave heating is legally controlled, and a microwave having a frequency of 2,450 MHz can now actually be used in this country.

The principle of the microwave heating is already well known. When a dielectic material (to be heated) is irradiated with a microwave, the dielectric material itself causes heat generation through the dielectric loss. Generally, when a substance to be heated having a dielectric power factor tan δ and a dielectric constant $\epsilon_r$ is located between a pair of parallel electrodes and a power source having a frequency f (MHz) and a voltage V (V) is connected to a distance D (cm) between the electrodes, a power P per unit volume absorbed in the above-mentioned heated material, namely, an amount of heat generated, is calculated using the following equation unless there is a space between the heated material and the electrodes.

$$P=(5/9)f\epsilon_r \tan\delta(V/D)^2 \times 10^{-12} (W \cdot cm^{-3})$$

As is understandable from the above equation, the amount of heat generated is proportional to the frequency (f) of the microwave heater used and the microwave electric field intensity $(V/D)^2$. Further, in the heated material, the higher the dielectic loss coefficient $\epsilon_r \tan \delta$, the higher the effect of heat generation by absorption of the microwave.

In the microwave heating, unlike heat conduction, an energy of a microwave is permeated instantaneously into a material to be heated with the velocity of light, and the material to be heated causes heat generation in from several seconds to several minutes. Further, heat generation occurs equally from the surface to the inner portion of the material to be heated at the same time.

On the other hand, metal oxides such as manganese dioxide and lithium manganate have a low thermal conductivity. Therefore, as mentioned hereinbefore, it takes a few hours to heat the material to hundreds of degrees Celsius using an electric oven for making uniform the temperatures of the sample from the surface to the inner portion. In addition, it is difficult to control the calcination temperature optionally.

Nevertheless, in accordance with the invention, as stated above, when the gel-like mixture of manganese dioxide and the lithium compound is prepared and heated through irradiation with the microwave, the mixture can be heated to a predetermined high temperature usually in from several minutes to 10 minutes; this is because manganese dioxide and spinel $LiMn_2O_4$ are excellent in the absorbability of the microwave in spite of the low thermal conductivity. During the calcination of the mixture of manganese dioxide and the lithium compound through the microwave heating, the mixture may be pulverized during the step and subjected again to the microwave heating if necessary.

Therefore, the process of the invention can provide desired spinel $LiMn_2O_4$ by preparing the gel-like mixture of manganese dioxide and the lithium compound, as required, drying the gel-like mixture, and then subjecting the same to the microwave heating usually at a temperature of from 300 to 800° C., preferably from 500 to 750° C., for from 5 minutes to 1.5 hours. The temperature and the time in the microwave heating are determined depending on the volume of the microwave heater or the amount of the mixture to be subjected to the microwave heating. The thus-obtained spinel $LiMn_2O_4$ is a dense powder having a uniform composition, and has excellent charge-discharge performance when it is utilized as a cathode material of a non-aqueous electrolyte lithium ion secondary battery.

When the microwave heating is employed to calcine the gel-like mixture, spinel $LiMn_2O_4$ having excellent performance can be obtained readily in a short period of time as compared to a method wherein the gel-like mixture is heated and calcined with an electric furnace only.

As noted above, the microwave heating may be employed to dry the gel-like mixture, if necessary. In this case, it is advisable to adjust the heating temperature to 200° C. or lower. Thereafter, the calcination is conducted through microwave heating at from 300 to 800° C. as mentioned above to give spinel $LiMn_2O_4$.

Especially, when the gel-like mixture composed of manganese dioxide and the lithium compound is prepared by the liquate impregnation method, and the gel-like mixture is calcined through the microwave heating, the nucleus of spinel $LiMn_2O_4$ is formed by the reaction between the lithium compound and manganese dioxide at a relatively low temperature, usually at 300° C. or lower. Thereafter, the reaction proceeds with the increase in the calcination temperature to grow fine crystals of spinel $LiMn_2O_4$. Thus, spinel $LiMn_2O_4$ having a large specific surface area can be obtained.

The calcination time is, as noted above, in the range of 5 minutes to 1.5 hours. The calcination for an excessively long period of time causes excessive growth of spinel $LiMn_2O_4$ crystals. If such spinel substance is used as a cathode material of a lithium ion secondary battery, the resultant cell is not improved in charge-discharge performance.

In accordance with the invention, it is most preferred that the gel-like mixture of manganese dioxide and the lithium compound is formed by the liquate impregnation method, and is then calcined by use of both microwave and electric furnace, whereby spinel $LiMn_2O_4$ providing a non-aqueous electrolyte lithium ion secondary battery having a high charge-discharge capacity is obtained readily and efficiently.

When the gel-like mixture of manganese dioxide and the lithium compound is first subjected to microwave heating and then heated with an electric furnace, it usually may be heated with a microwave heater to from 500 to 650° C. for from 2 to 30 minutes and then with an electric furnace at from 650 to 800° C. for from 30 minutes to 12 hours. In this case, the heating temperature and time are determined depending on the amount of the mixture to be subjected to the microwave heating and the capacity of the microwave heater used. In this manner, spinel $LiMn_2O_4$ having a high charge-discharge capacity can be formed by heating and calcining the gel-like mixture of manganese dioxide and the lithium compound through the microwave heating and the heating with an electric furnaceto control excessive crystallization of spinel $LiMn_2O_4$ formed.

However, it is also possible that the gel-like mixture is heated and calcined with an electric furnace at a temperature of from 250 to 350° C. for from 1 to 5 hours, and the resulting product is, as required, pulverized, and then calcined with microwave.

As stated above, according to the process of the invention, the gel-like mixture of the lithium compound and manganese dioxide is formed by the liquate impregnation method, and calcined to obtain the lithium manganese oxide having a spinel structure. Accordingly, it is possible to produce spinel $LiMn_2O_4$ that is suitable for use as a cathode material of a non-aqueous electrolyte lithium ion secondary battery having a high energy density and excellent cycle performance by a simple process using less costly starting materials.

Further, according to the process of the invention, the gel-like mixture is formed by the liquate impregnation method, and then calcined through the heating including microwave heating, making it possible easily to produce at high efficiency spinel $LiMn_2O_4$ especially suitable for use as above mentioned.

The invention is illustrated specifically by referring to the following Examples. However, the invention is not limited thereto.

In the following Examples, manganese dioxide used had a purity of approximately 92%, and an amount of manganese dioxide relative to the lithium compound was calculated on condition that the amount of manganese in manganese dioxide was 58% by weight.

EXAMPLE 1

A powder (1.05 kg) of manganese dioxide was added to 0.5 liters of methanol to form a suspension. A powder (0.23 kg) of lithium hydroxide monohydrate was added thereto while being stirred, to dissolve the lithium hydroxide in the solvent. Then 0.5 liters of formic acid was added to the resultant mixture under stirring, whereby manganese dioxide was dissolved in the mixture through a chemical reaction, to form a gel-like mixture. This gel-like mixture was dried by heating at 130° C for 3 hours, and calcined at 350° C. for 1 hour and then at 650° C. for 5 hours to provide spinel $LiMn_2O_4$.

FIG. 1 illustrates X-ray diffraction patterns of the dried gel-like mixture prepared above and calcined product obtained by calcination the gel-like mixture for 2 hours to 0.5 hour at every 100° C. from 200° C. to 800° C. In FIG. 1, the lowest diffraction pattern indicates the gel-like mixture before calcination.

EXAMPLE 2

A powder (1.05 kg) of manganese dioxide was added to 400 milliliters of water, and 215 g of a powder of lithium carbonate were added to the resulting suspension. Further, 360 milliliters of acetic acid were added thereto with stirring, to dissolve the lithium carbonate in the solvent by a chemical reaction with the acetic acid. The resultant mixture was stirred and allowed to form a gel-like mixture. The gel-like mixture was dried, and then calcined at 650° C. for 10 minutes, 30 minutes, 1 hour or 5 hours.

Figure 2:
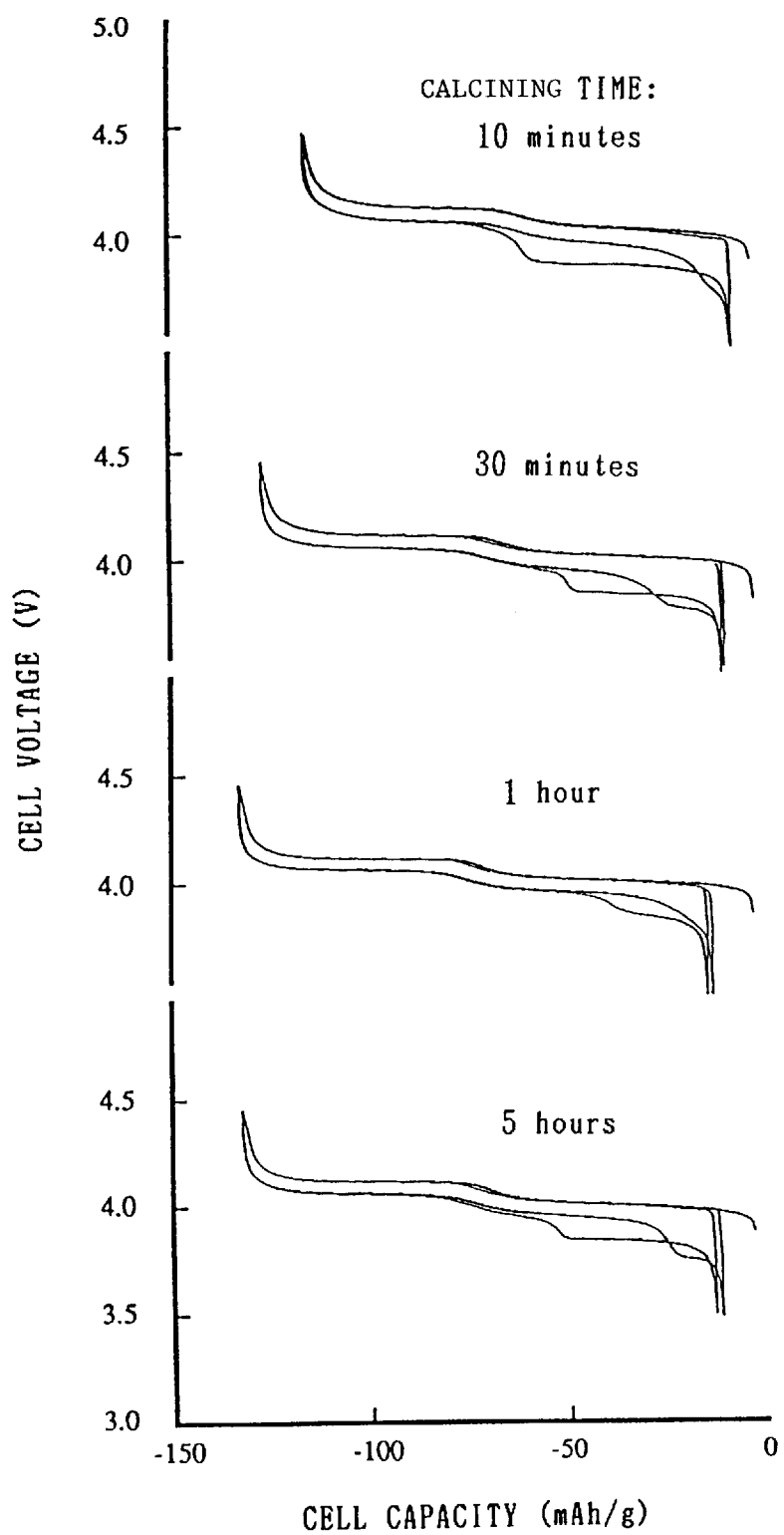
FIG. 2 is a charge-discharge curve of a test cell (non-aqueous electrolyte lithium ion secondary battery) which uses as a cathode material spinel $LiMn_2O_4$ prepared by drying and calcining a gel-like mixture at 650° C. for a varied period of time according to the process of the invention.

FIG. 2 illustrates charge-discharge curves of a test cell (non-aqueous electrolyte lithium ion secondary battery) which had as a cathode material the spinel $LiMn_2O_4$ obtained in this way by calcination for a relatively short period of time. In FIG. 2, the charge is expressed by minus. The discharge current density is 0.4 mA/cm$^2$.

In the test cell, a solution obtained by dissolving 1 M of $LiPF_6$ in a mixture of propylene carbonate (PC) and diethyl carbonate (DEC) at a volume ratio of 1:4 was used as an electrolyte. The same test battery as above was used in the following Examples.

EXAMPLE 3

A powder (2.13 kg) of manganese dioxide was added to 1 liter of methanol while being stirred to form a suspension. A powder (0.46 kg) of lithium hydroxide monohydrate was added to this suspension to dissolve the lithium compound in the solvent. The resultant mixture was stirred and allowed to form a gel-like mixture. The gel-like mixture was heated at 100° C. for 1 hour, dried, and then calcined at 350° C. for 2 hours, and further calcined at 650° C. for 5 hours to provide spinel $LiMn_2O_4$.

Figure 3:
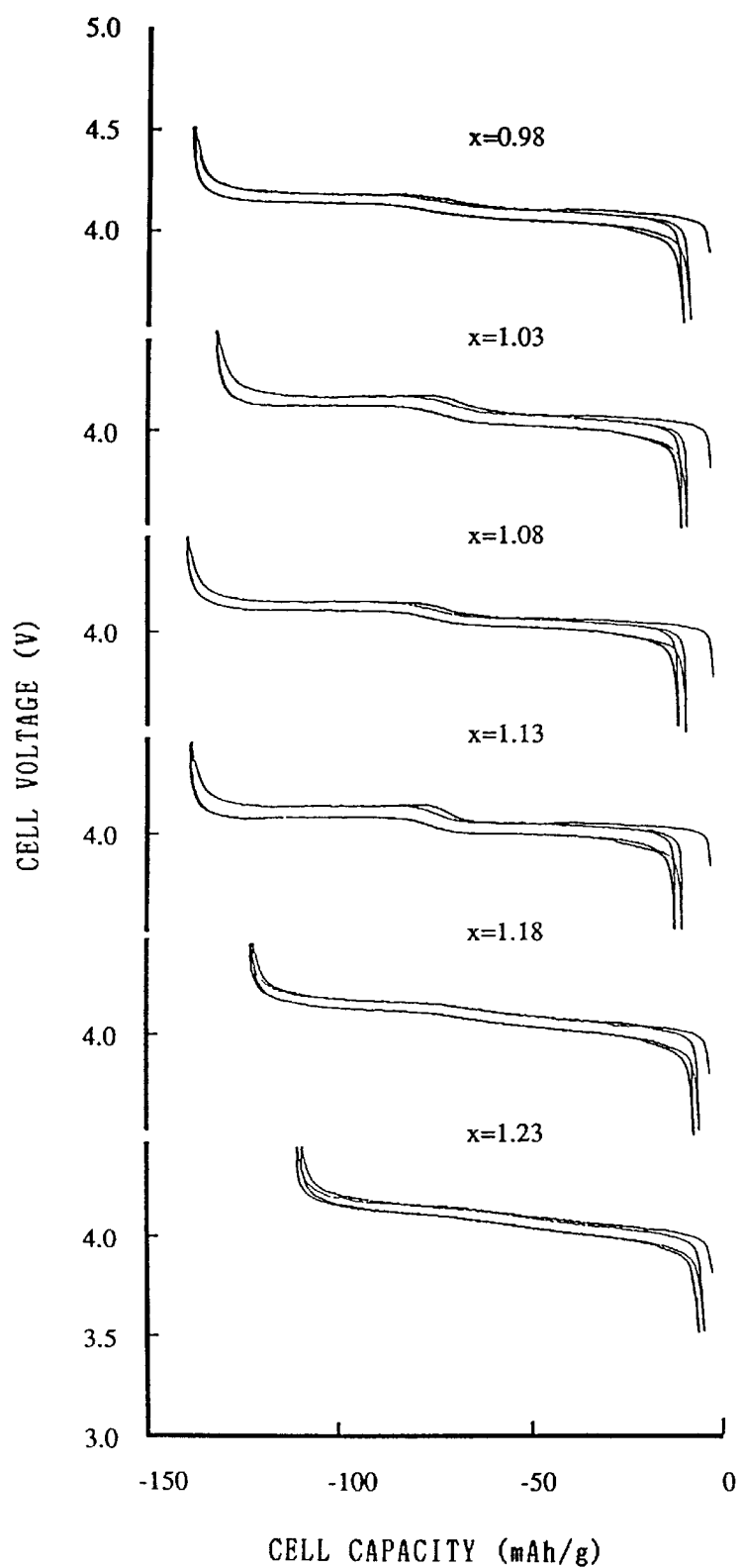
FIG. 3 is the first three charge-discharge curves of a test cell which uses spinel $Li_xMn_2O_4$ with x=0.98, 1.03, 1.08, 1.13, 1.18 or 1.23 as a cathode material.

FIG. 3 illustrates the first three charge-discharge curves of a test cell which had the thus-obtained spinel $Li_xMn_2O_4$ (x=0.98). In FIG. 3, the charge is expressed by minus.

Likewise, spinel $Li_xMn_2O_4$ with x=1.03, 1.08, 1.13, 1.18 or 1.23 was prepared, and the initial three charge-discharge curves thereof are shown in FIG. 3.

Figure 4:
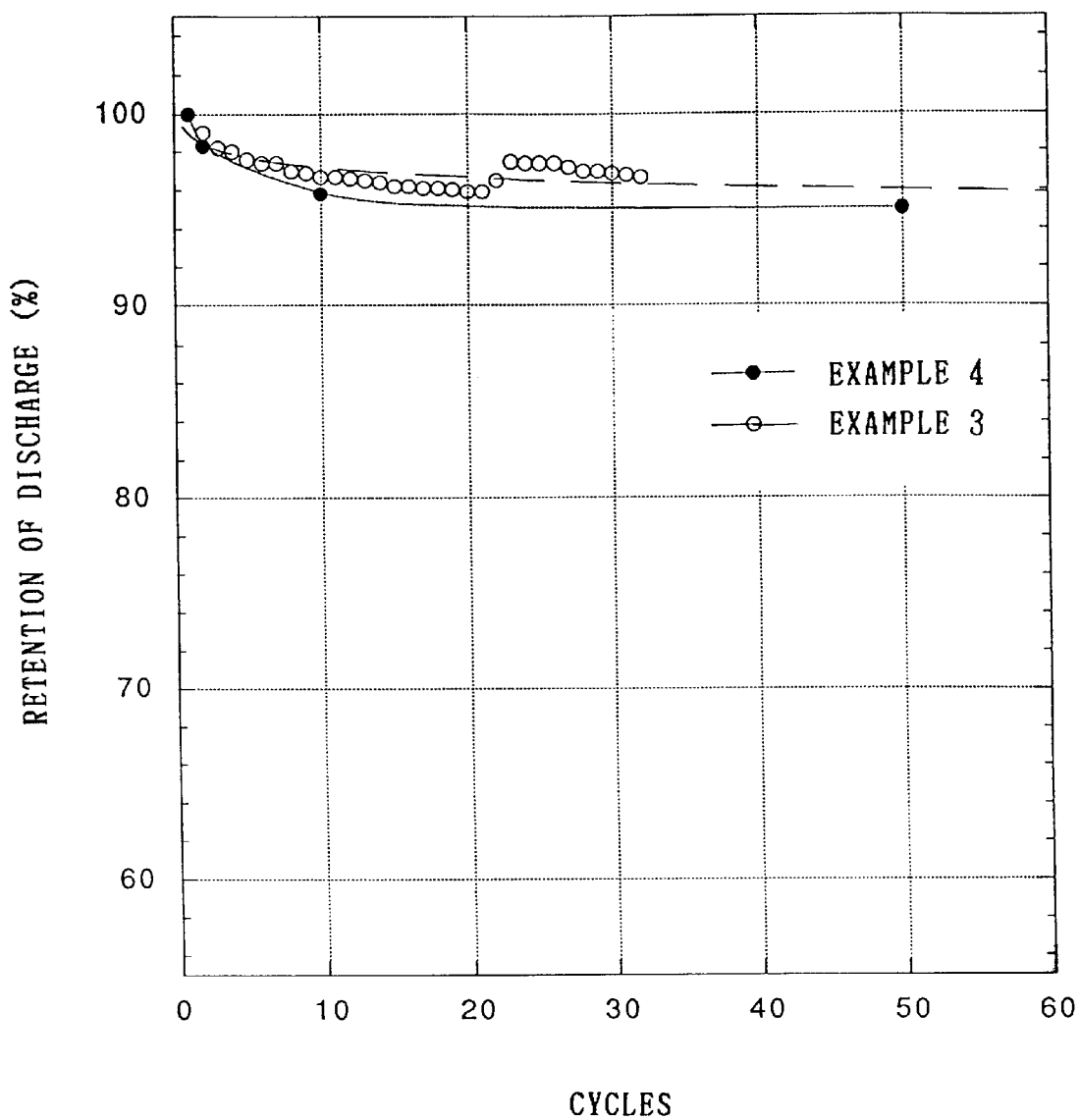
FIG. 4 is a graph showing cycle performance of a test cell which uses spinel $LiMn_2O_4$ prepared in Examples 3 and 4 as a cathode material.

Cycle performance of spinel $LiMn_2O_4$ formed by this Example is shown in FIG. 4. As is clear from FIG. 4, the product retains the capacity of approximately 95% even after 50 cycles.

Thus, spinel $LiMn_2O_4$ obtained by the process of the invention has a high discharge capacity over the wide range of the lithium content, and the initial charge-discharge capacity is between 125 and 140 mAh/g.

EXAMPLE 4

A powder (10.5 kg) of manganese dioxide was added to 5 liters of methanol while being stirred to form a suspension. A powder (2.31 kg) of lithium hydroxide monohydrate was added to the suspension to dissolve the lithium compound in the solvent. The resultant mixture was stirred and allowed to form a gel-like mixture. The gel-like mixture was spray-dried, and the dry product was then calcined at 650° C. for 5 hours to provide spinel $LiMn_2O_4$ without being pulverized.

Cyclic performance of a test cell which had the spinel $LiMn_2O_4$ is shown in FIG. 4. As is clear from FIG. 4, the product retains the capacity of approximately 95% even after 50 cycles. The discharge current density was 0.4 mA/cm$^2$.

EXAMPLE 5

Manganese dioxide (1.05 kg) and 0.23 kg of lithium hydroxide monohydrate were added to 0.35 liters of methanol while being stirred, to dissolve the lithium compound in the methanol. The resultant mixture was stirred and was allowed to form a gel-like mixture having a Mn/Li molar ratio of 2. Five-hundred grams of this gel-like mixture were placed on a microwave heater (500 W), and heated for 90 minutes to provide spinel $LiMn_2O_4$.

Figure 5:
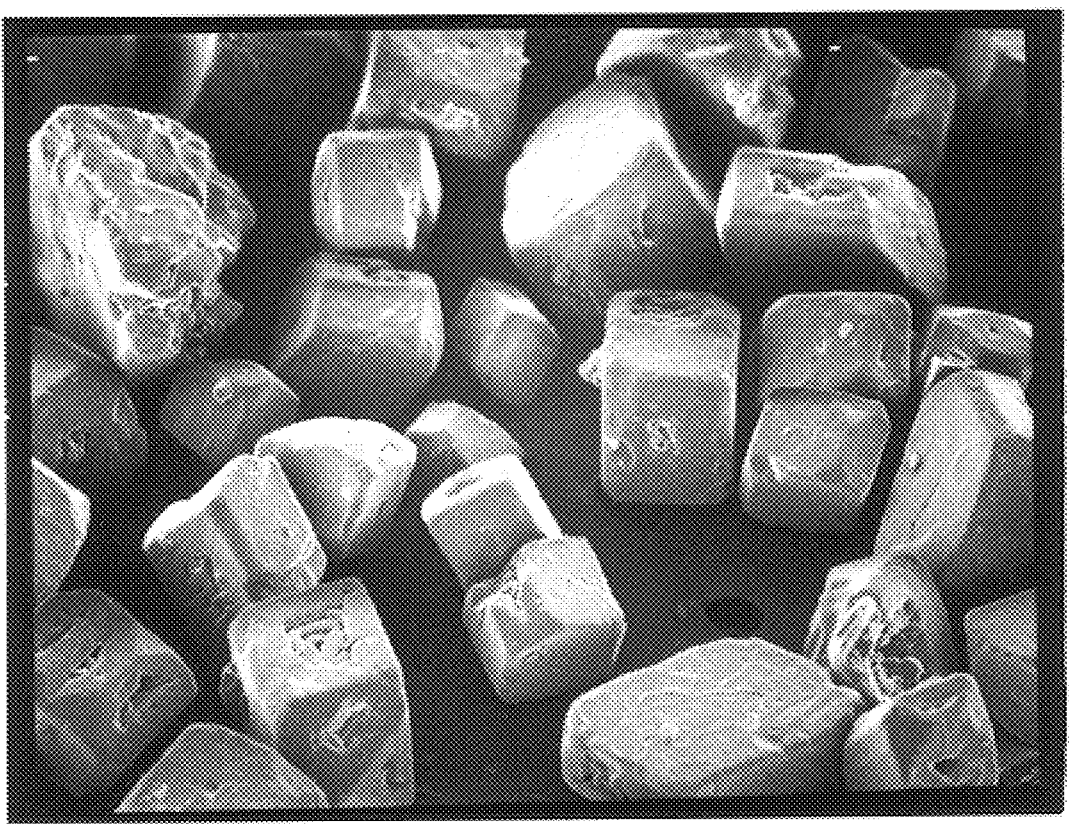
FIG. 5 is an electron micrograph (magnification 35×) of lithium hydroxide monohydrate used as a starting material in Example 5.
Figure 6:
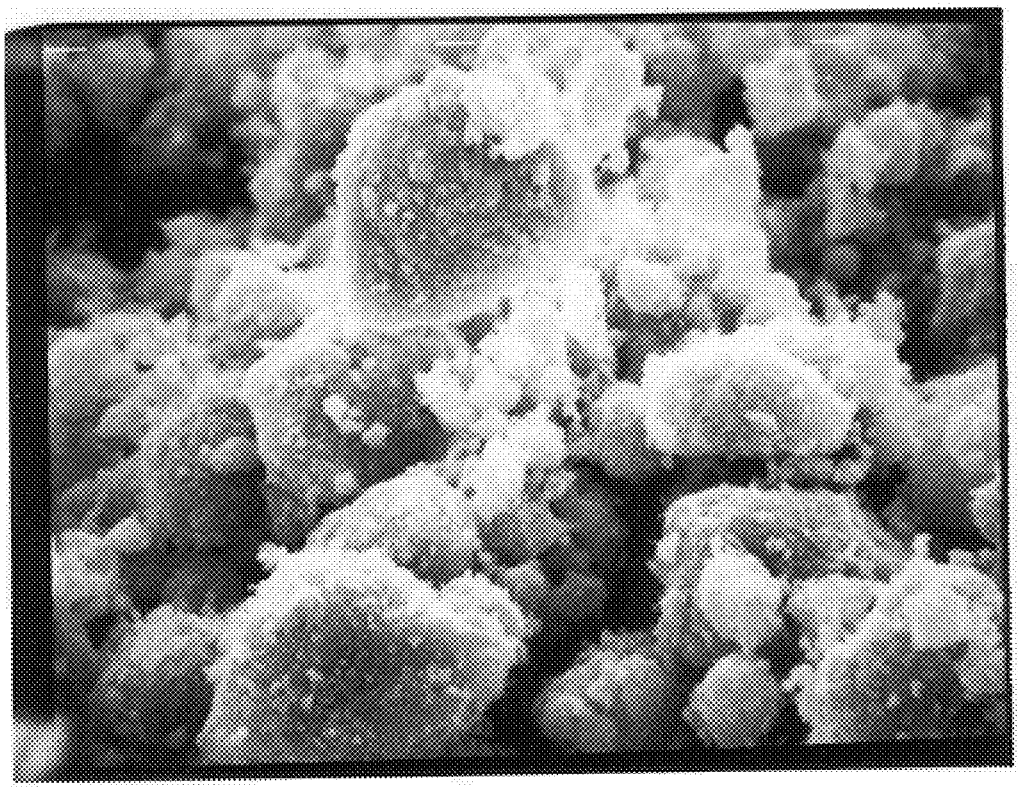
FIG. 6 is an electron micrograph (magnification 5,000×) of manganese dioxide used as a starting material in Example 5.
Figure 7:
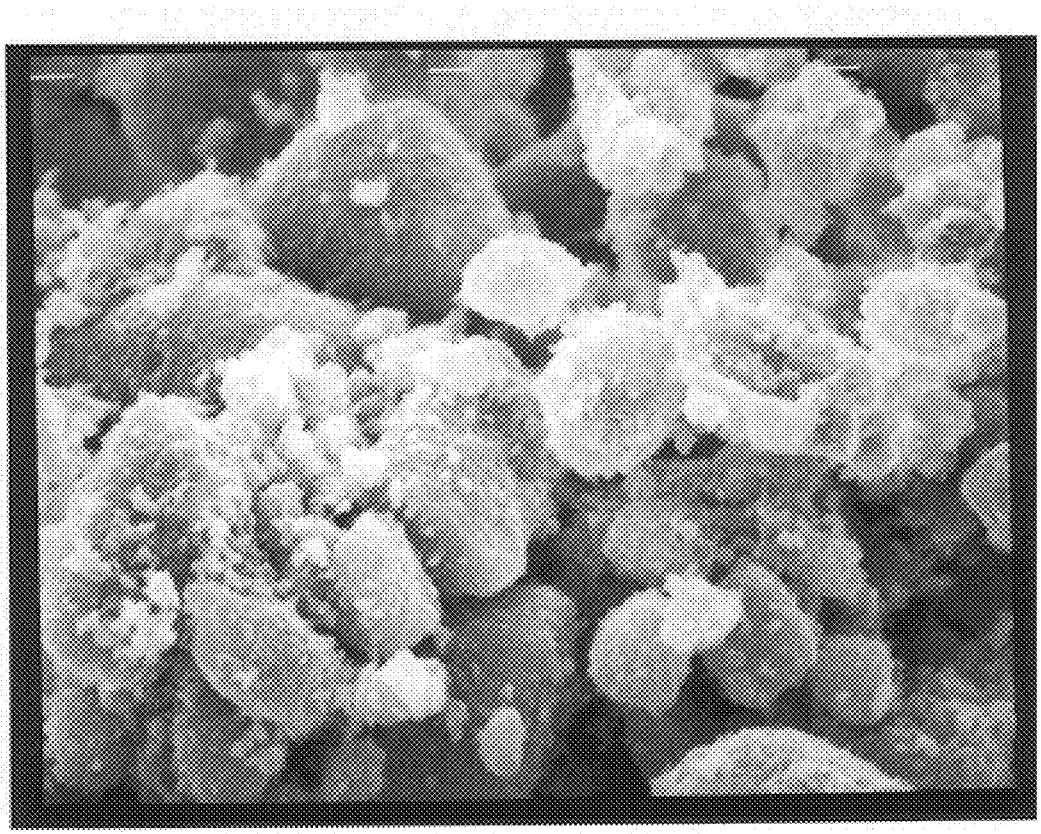
FIG. 7 is an electron micrograph (magnification 5,000×) of a dried gel-like mixture obtained by a liquate impregnation method in which the above-mentioned lithium hydroxide monohydrate is mixed with manganese dioxide in methanol in Example 5.
Figure 8:
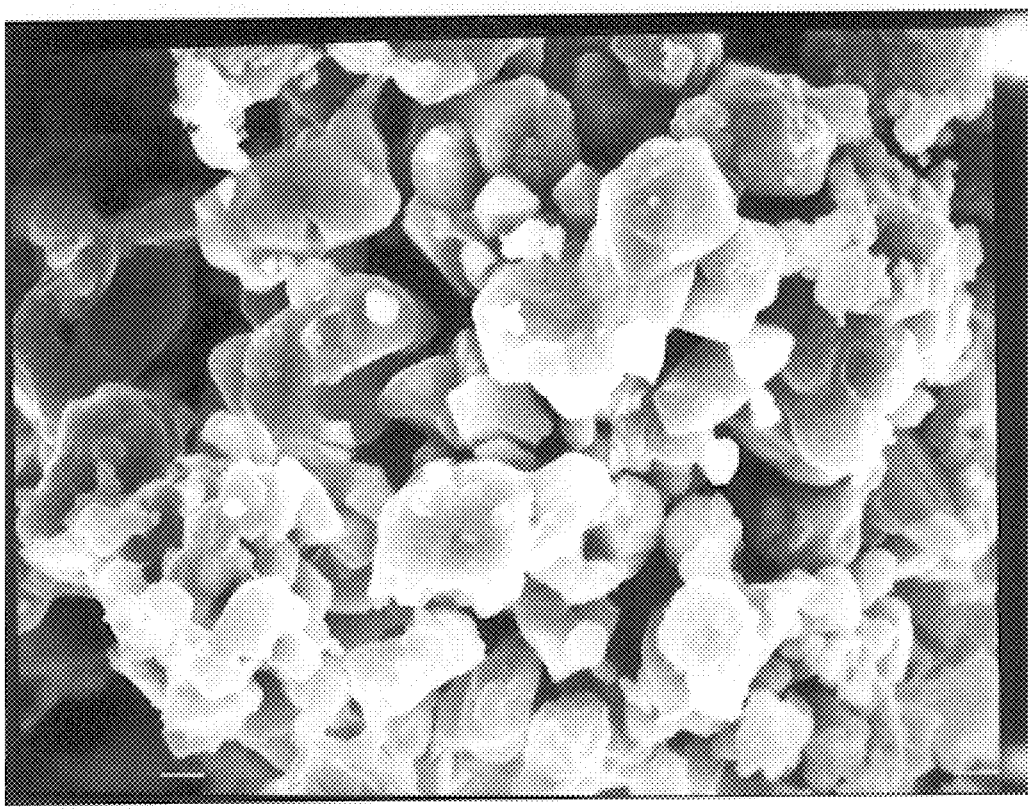
FIG. 8 is an electron micrograph (magnification 5,000×) of spinel $LiMn_2O_4$ obtained by subjecting the gel-like mixture to microwave heating in Example 5.

The electron micrograph of the lithium hydroxide monohydrate used as a starting material is shown in FIG. 5 (magnification 50×), the electron micrograph of manganese dioxide in FIG. 6 (magnification 5,000×), the electron micrograph of the gel-like mixture obtained by the liquate impregnation method according to the invention in FIG. 7 (magnification 5,000×), and the electron micrograph of the spinel $LiMn_2L_4$ thus obtained in FIG. 8 (magnification 5,000×), respectively.

Upon comparing FIG. 5 with FIG. 6, it becomes apparent that particles of lithium hydroxide monohydrate are by far larger than particles of manganese dioxide. However, no lithium compound is found in a mixture obtained as the gel-like mixture of the lithium compound and manganese dioxide by the liquate impregnation method, as shown in FIG. 7. That is, the process of the invention can provide a uniform mixture in such a manner that the lithium compound is ionized and the porous manganese dioxide is impregnated therewith. As shown in FIG. 8, the resultant spinel $LiMn_2O_4$ is uniform, and partially crystallized.

EXAMPLE 6

Figure 9:
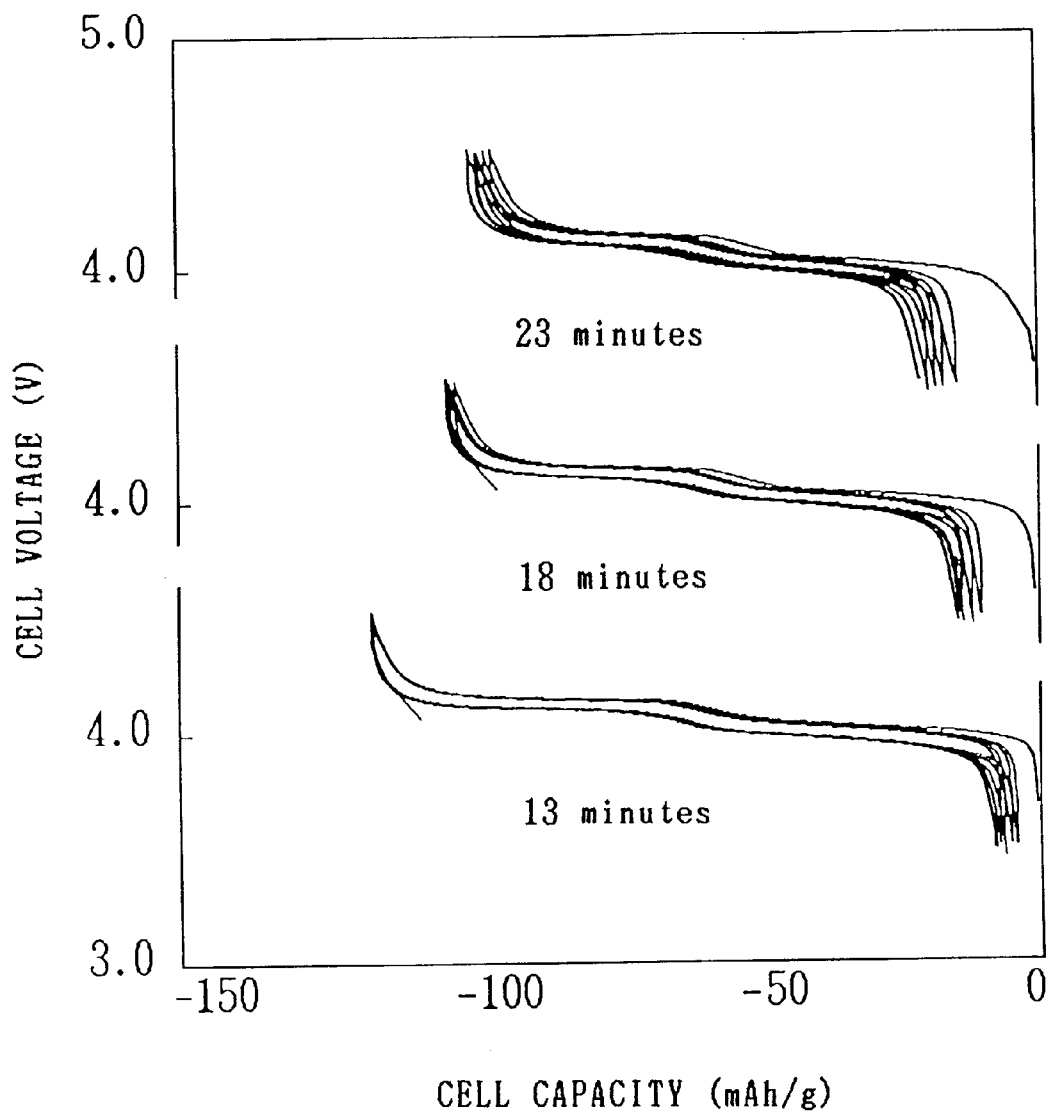
FIG. 9 is a graph showing charge-discharge curve of a cell which uses spinel $LiMn_2O_4$ obtained in Example 6 as as a cathode material.

Manganese dioxide (2.63 kg) and 0.54 kg of lithium hydroxide monohydrate were added to 1.05 liters of methanol while being stirred, and the resultant mixture was stirred and allowed to form a gel-like mixture having a Mn/Li molar ratio of 2. The gel-like mixture was placed on a microwave heater (5 kW), heated, and dried. Then, 2.5 kg of the mixture was placed on a microwave heter (5 kW), and heated for 13 minutes, 18 minutes or 23 minutes to prepare spinel $LiMn_2O_4$. The charge-discharge performance of a test cell which had the resulting spinel $LiMn_2O_4$ as a cathode material is shown in FIG. 9. The initial charge-discharge capacity was approximately 120 mAh/g.

EXAMPLE 7

Figure 10:
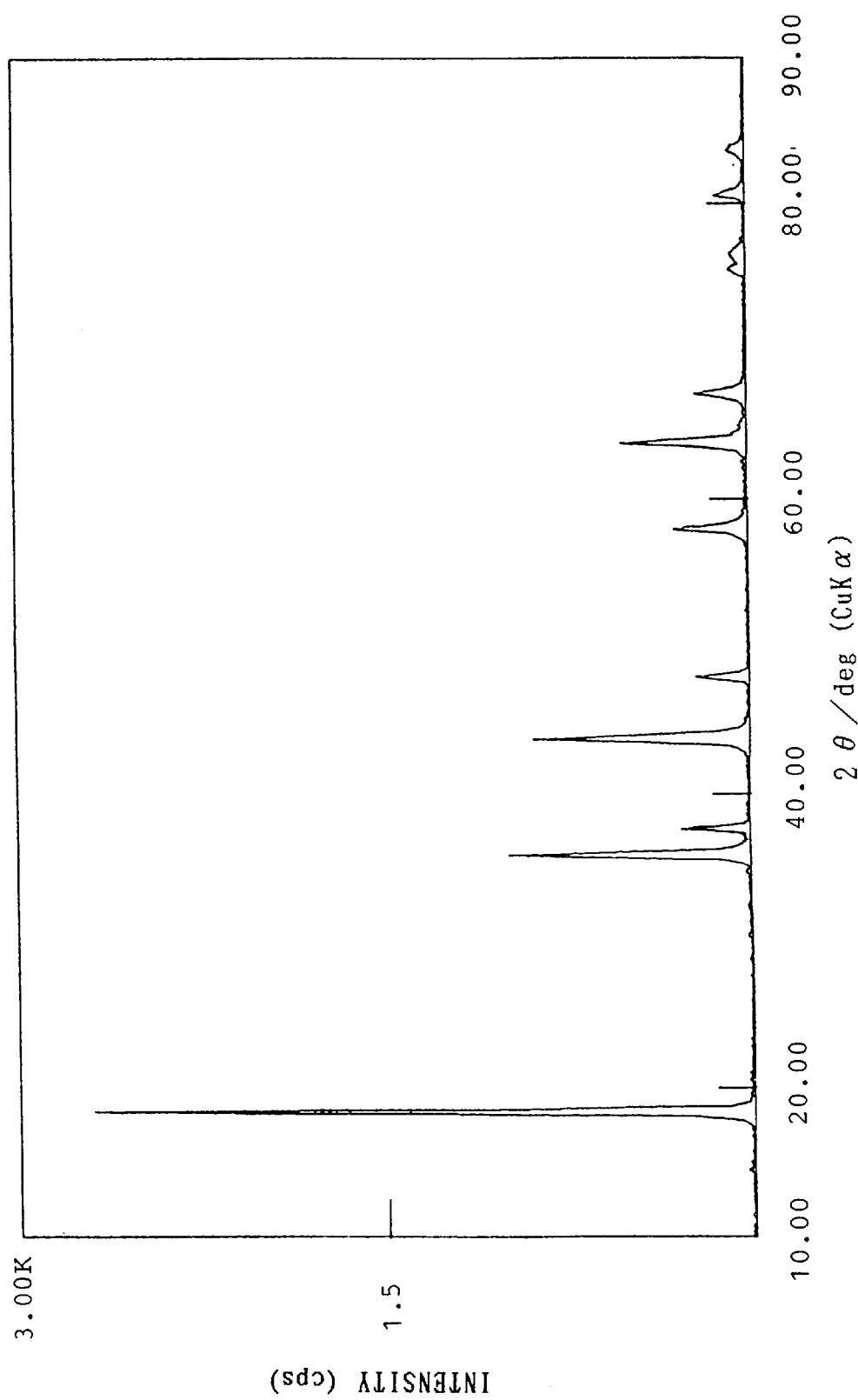
FIG. 10 is an X-ray diffraction pattern of spinel $LiMn_2O_4$ obtained by the process of the invention in Example 7.
Figure 11:
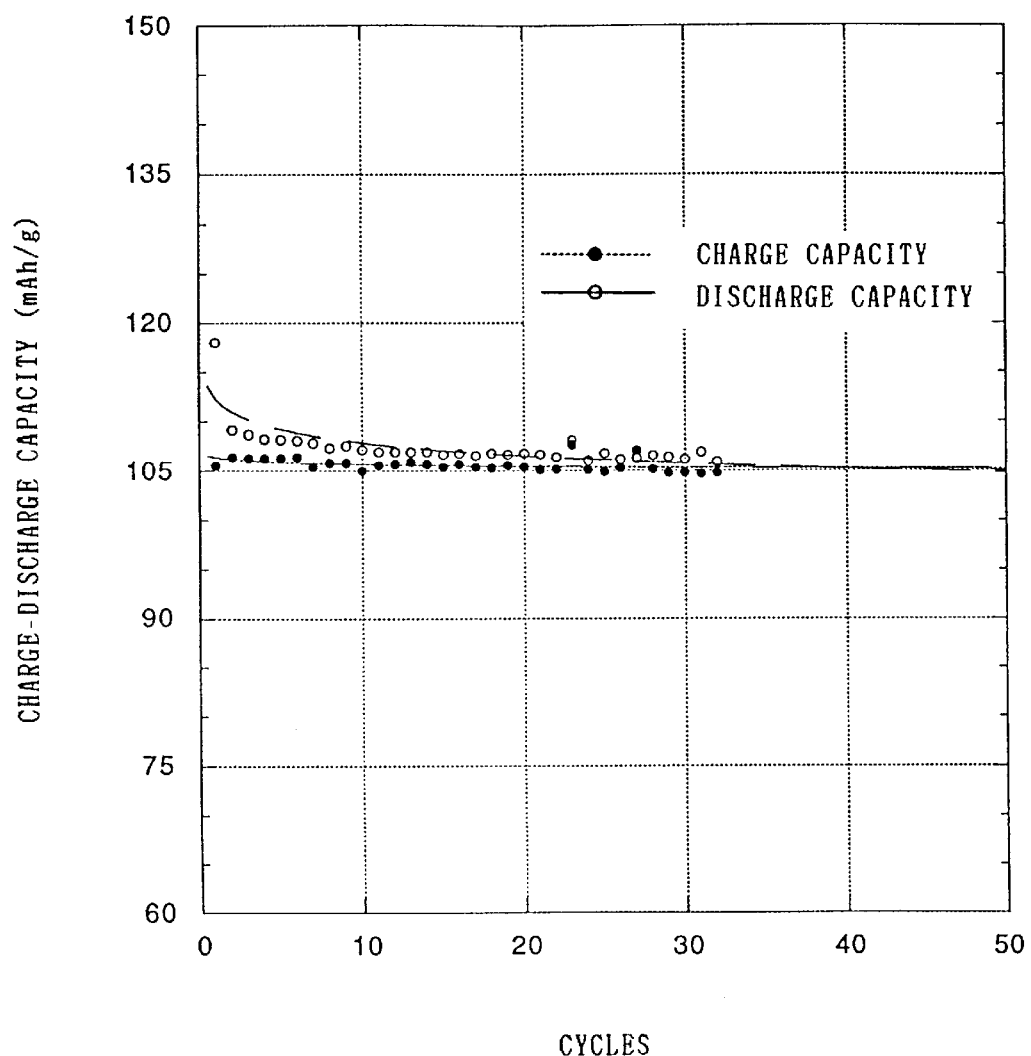
FIG. 11 is a graph showing cycle performance of a cell which uses spinel $LiMn_2O_4$ obtained in Example 7 as a cathode material.

Manganese dioxide (1.05 kg) and 0.23 kg of lithium hydroxide monohydrate were added to 0.35 liters of methanol while being stirred to dissolve the lithium compound in the solvent, and the resultnat mixture was stiired to allow to form a gel-like mixture having a Mn/Li molarratio of 2. Five-hundred grams of the gel-like mixture were placed on a microwave heater (500 W), and heated for 30 minutes to provide spinel $LiMn_2O_4$. The X-ray diffraction pattern of the resulting spinel $LiMn_2O_4$ is shown in FIG. 10. Cycle performance of a test cell which had the spinel $LiMn_2O_4$ as a cathode material is shown in FIG. 11. The discharge current density is 0.4 mA/cm². The initial charge-discharge capacity was approximately 120 mAh/g, and the charge-discharge capacity was then stable, between 105 and 110 mAh/g.

EXAMPLE 8

Manganese dioxide (2.10 kg) and 0.47 kg of lithium hydroxide monohydrate were added to 0.70 liters of methanol while being stirred to dissolve the lithium compound in the solvent, and the resultant mixture was stirred to form a gel-like mixture having a Mn/Li molar ratio of 2.The gel-like mixture was dried, and then 0.2 kg of the gel-like mixture were heated to 650–700° C. with a microwave heater (1.6 kW) for 5 minutes, and immediately thereafter heated to 750° C. with an electric furnace for a predetermined period of time. The charge-discharge performance of a test cell which had the resulting spinel $LiMn_2O_4$ as a cathode material is shown in Table 1.

Figure 12:
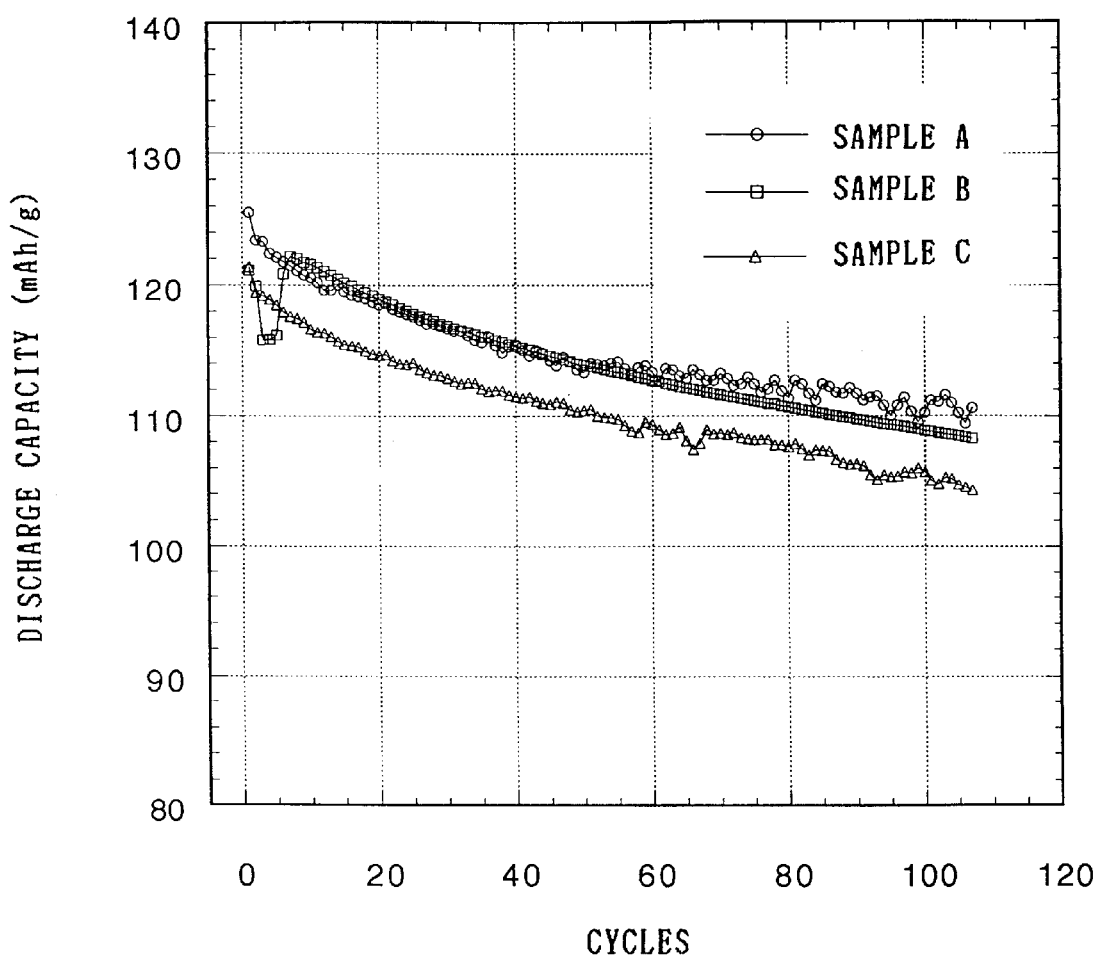
FIG. 12 is a graph showing cycle performance of a cell which uses spinel $LiMn_2O_4$ obtained in Examples 9 to 11 as a cathode material.

(Sample A). The charge-discharge performance of a test cell which had the resulting spinel $LiMn_2O_4$ as a cathode material is shown in FIG. 12.

EXAMPLE 10

Figure 13:
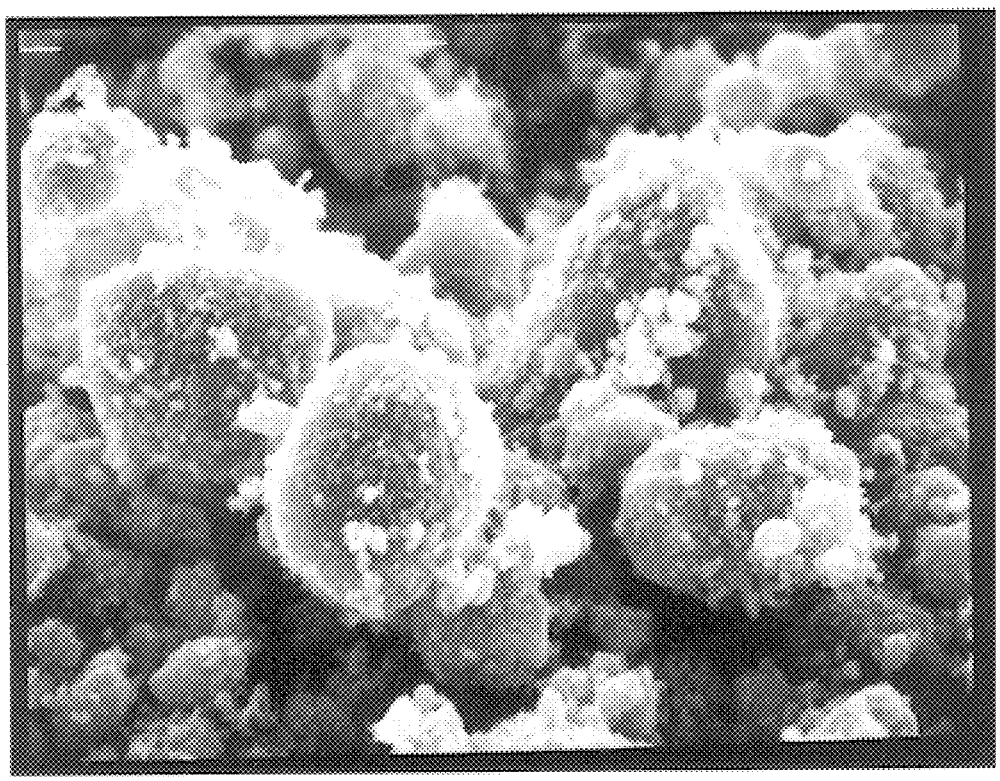
FIG. 13 is an electron micrograph (magnification 5,000×) of spinel $LiMn_2O_4$ prepared in Example 10.

A powder (1.05 kg) of manganese dioxide was added to 0.5 liters of methanol while being stirred to form a suspension. A powder (0.23 kg) of lithium hydroxide monohydrate was added to the suspension to dissolve the lithium compound in the solvent. The resultant mixture was stirred and allowed to form a gel-like mixture. The resultant mixture was stirred and allowed to form a gel-like mixture. The gel-like mixture was dried by heating at 100° C. for 1 hour, and the resultant product was further heated at 700° C. for 10 hours with an electric furnace, to provide spinel $LiMn_2O_4$ (Sample B). The charge-discharge performance of a test cell which had the resulting spinel $LiMn_2O_4$ as a cathode material is shown in FIG. 12. The electron micrograph of the spinel $LiMn_2L_4$ thus obtained is shown in FIG. 13 (magnification 5,000×).

EXAMPLE 11

A powder (1.05 kg) of manganese dioxide was added to 0.5 liters of distilled water while being stirred to form a suspension. A powder (0.23 kg) of lithium hydroxide monohydrate was added to the suspension. The mixture was heated with stirring and allowed to form a gel-like mixture. The gel-like mixture was dried on a microwave heater (1.5 kW) for 10 minutes, and then the resultant product was further heated at 700° C. for 10 hours with an electric

TABLE 1

| | | Cycles | | | | | | | | |
|---|---|---|---|---|---|---|---|---|---|---|
| | | 1st Charge-Discharge Capacity (mAh/g) | | 2nd Charge-Discharge Capacity (mAh/g) | | 3rd Charge-Discharge Capacity (mAh/g) | | 4th Charge-Discharge Capacity (mAh/g) | | 5th Charge-Discharge Capacity (mAh/g) | |
| Sample | Heating Time (hr) | C. | D. | C. | D. | C. | D. | C. | D. | C. | D. |
| a | 0.5 | 127 | 122 | 122 | 120 | 121 | 120 | 120 | 119 | 119 | 118 |
| b | 1.0 | 134 | 128 | 128 | 126 | 126 | 124 | 124 | 122 | 123 | 122 |
| cc | 2.0 | 139 | 132 | 132 | 130 | 131 | 129 | 128 | 127 | 127 | 128 |
| d | 4.0 | 138 | 130 | 129 | 128 | 128 | 126 | 126 | 123 | 124 | 123 |
| e | 8.0 | 137 | 129 | 128 | 126 | 127 | 124 | 124 | 122 | 122 | 122 |

Notes:
C.: Charge capacity;
D.: Discharge capacity

In Table 1, as shown in the first cycle, the gel-like mixture of the lithium compound and manganese dioxide is heated with microwave, and then heated with an electric furnace, whereby the resulting spinel $LiMn_2O_4$ has a notably high charge-discharge capacity. A theoretical charge-discharge capacity of spinel $LiMn_2O_4$ is 148 mAh/g.

EXAMPLE 9

A powder (3.15 kg) of manganese dioxide was added to 1.5 liters of methanol while being stirred to form a suspension. A powder (0.69 kg) of lithium hydroxide monohydrate was added to the suspension to dissolve the lithium compound in the solvent. The resultant mixture was stirred and allowed to form a gel-like mixture. The gel-like mixture was placed on a microwave heater (3.0 kW) and was dried by heating for 5 minutes, followed by further heating for 20 minutes with microwave, to provide spinel $LiMn_2O_4$ furnace, to provide spinel $LiMn_2O_4$ (Sample C). The charge-discharge performance of a test cell which had the resulting spinel $LiMn_2O_4$ as a cathode material is shown in FIG. 12.

EXAMPLE 12

Figure 14:
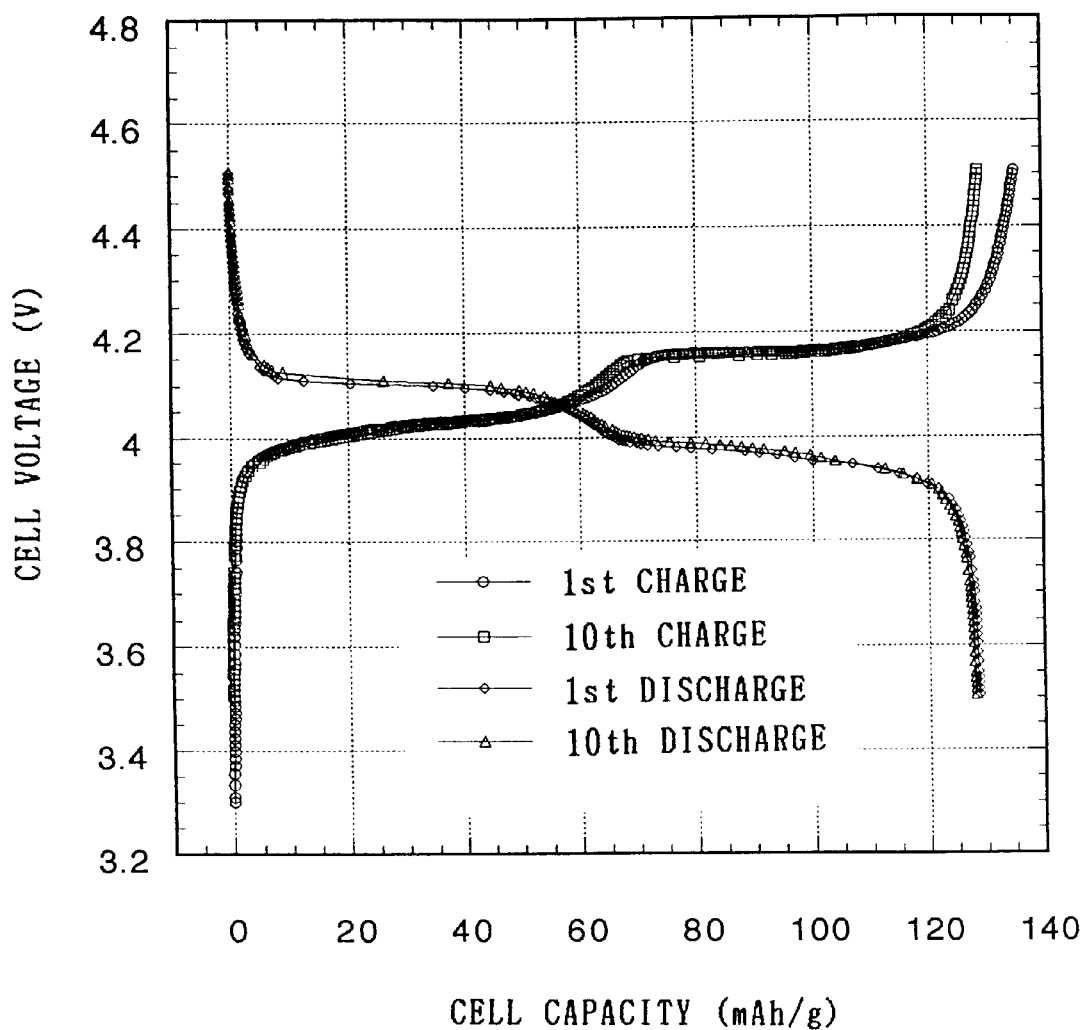
FIG. 14 is a graph showing a charge-discharge curve of a cell which uses spinel $LiMn_2O_4$ prepared in Example 12 as a cathode material.

A powder (1.05 kg) of manganese dioxide was added to 0.5 liters of methanol while being stirred to form a suspension. A powder (0.231 kg) of lithium hydroxide monohydrate was added to the suspension, and then 0.15 litters of formic acid to the suspension to dissolve the manganese dioxide as well as the lithium hydroxide. The resultant mixture was stirred and allowed to form a gel-like mixture. The gel-like mixture was dried on a microwave heater (1.5 kW) for 10 minutes, and then the resultant product was further heated at 700° C. for 10 hours with an electric furnace, to provide spinel $LiMn_2O_4$. The charge-discharge performance of a test cell which had the resulting spinel $LiMn_2O_4$ as a cathode material is shown in FIG. 14.

What is claimed is:

1. A process for producing a lithium manganese oxide with a spinel structure useful as a cathode material of an organic electrolyte lithium ion secondary battery, which comprises:

mixing lithium hydroxide with porous particles of manganese dioxide in a solvent selected from the group consisting of an aliphatic lower alcohol having from 1 to 3 carbon atoms and a mixture containing the aliphatic lower alcohol and water in an amount up to 20 weight % to dissolve the lithium hydroxide in the solvent and diffuse the resultant lithium ions into the porous particles of manganese dioxide thereby to form a mixture; and then calcining said mixture at a temperature ranging from 300–800° C. to form lithium manganese oxide with a spinel structure.

2. The process as claimed in claim 1, further comprising drying the mixture before calcining.

3. The process as claimed in claim 1, wherein 20–200 ml of the solvent is used per 100 g of manganese dioxide.

4. The process as claimed in claim 1, wherein the aliphatic lower alcohol is methanol.

5. The process as claimed in claim 1, wherein the mixture is calcined at a temperature of from 500° C. to 800° C.

6. The process as claimed in claim 1, wherein in the calcination of the mixture, at least a part of the heating for the calcination is conducted through microwave heating.

7. The process as claimed in claim 1, wherein the mixture is calcined through microwave heating at a temperature of from 300° C. to 800° C.

8. The process as claimed in claim 1, wherein the mixture is first heated with microwave, and then heated with an electric furnace at a temperature of from 600° C. to 800° C.

9. A process for producing a lithium manganese oxide with a spinel structure useful as a cathode material of an organic electrolyte lithium ion secondary battery, which comprises:

mixing lithium hydroxide with porous particles of manganese dioxide in a solvent selected from the group consisting of an aliphatic lower alcohol having from 1 to 3 carbon atoms and a mixture containing the aliphatic lower alcohol and water in an amount up to 20 weight %, in the presence of at least one organic acid selected from the group consisting of formic acid and acetic acid, to dissolve the lithium compound and a part of the manganese dioxide in the solvent and diffuse the resultant lithium ions into the porous particles of manganese dioxide thereby to form a mixture; and then calcining said mixture to form lithium manganese oxide with a spinel structure.

10. The process as claimed in claim 9, further comprising drying the mixture before calcining.

11. The process as claimed in claim 9, wherein 20–200 ml of the solvent is used per 100 g of manganese dioxide.

12. The process as claimed in claim 9, wherein the aliphatic lower alcohol is methanol.

13. The process as claimed in claim 9, wherein the mixture is calcined at a temperature of from 500° C. to 800° C.

14. The process as claimed in claim 9, wherein in the calcination of the mixture, at least a part of the heating for the calcination is conducted through microwave heating.

15. The process as claimed in claim 9, wherein the mixture is calcined through microwave heating at a temperature of from 300° C. to 800° C.

16. The process as claimed in claim 9, wherein the mixture is first heated with microwave, and then heated with an electric furnace at a temperature of from 600° C. to 800° C.

* * * * *